United States Patent
Zhang et al.

(10) Patent No.: US 12,222,886 B2
(45) Date of Patent: Feb. 11, 2025

(54) SERIAL TRANSMISSION CONTROLLER AND DATA TRANSMISSION METHOD THEREOF

(71) Applicant: Shanghai Zhaoxin Semiconductor Co., Ltd., Shanghai (CN)

(72) Inventors: Jiaping Zhang, Beijing (CN); Hongchao Ma, Beijing (CN); Zhiqiang Hui, Beijing (CN); Lin Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 181 days.

(21) Appl. No.: 17/935,684

(22) Filed: Sep. 27, 2022

(65) Prior Publication Data
US 2023/0134412 A1 May 4, 2023

(30) Foreign Application Priority Data
Oct. 28, 2021 (CN) .......................... 202111264426.4

(51) Int. Cl.
*G06F 13/40* (2006.01)
*G06F 12/0868* (2016.01)
*G06F 13/42* (2006.01)

(52) U.S. Cl.
CPC ...... *G06F 13/4068* (2013.01); *G06F 12/0868* (2013.01); *G06F 13/4282* (2013.01)

(58) Field of Classification Search
None
See application file for complete search history.

(56) References Cited

U.S. PATENT DOCUMENTS 6,067,591 A * 5/2000 Howard .................. G06F 13/36
 710/100
9,690,742 B2 * 6/2017 Hartwich .............. H04L 1/0083

\* cited by examiner

*Primary Examiner* — Farley Abad
*Assistant Examiner* — Dayton Lewis-Taylor
(74) *Attorney, Agent, or Firm* — McClure, Qualey & Rodack, LLP

(57) ABSTRACT

A serial transmission controller for processing data transmissions between a memory and an external device is provided. The serial transmission controller includes a microcontroller, a scheduling unit, a transmission unit, and an interception control unit. The microcontroller obtains pipe data from the memory. The microcontroller reads a transfer request block from the memory according to the pipe data. The scheduling unit generates a transmission request according to the pipe data and the transfer request block. The transmission unit transmits a packet of the transfer request block according to the transmission request, and correspondingly generates a transmission response. When the interception control unit receives the transmission response, and the data length that has not been transmitted in the transfer request block is greater than 0, the interception control unit notifies the transmission unit to continue to transmit a next packet of the transfer request block.

20 Claims, 5 Drawing Sheets

SERIAL TRANSMISSION CONTROLLER AND DATA TRANSMISSION METHOD THEREOF

CROSS REFERENCE TO RELATED APPLICATIONS

This application claims the benefit of China Application 202111264426.4, filed on Oct. 28, 2021, the entirety of which is/are incorporated by reference herein.

BACKGROUND

Technical Field

The present application relates to an electronic device, and, in particular, to a serial transmission controller and a data transmission method thereof.

Description of the Related Art

According to the Universal Serial Bus (USB) protocol, since the host may be connected to multiple USB devices at the same time, actual data transmission between the USB device and the host is conducted through an endpoint of the USB device. In order to perform data transmission between the USB device and the host, pipe data and a plurality of transfer request blocks (TRB) corresponding to the endpoint of the USB device are generated and stored in the memory of the host. Each transfer request block corresponds to a different physical storage block in the memory.

When the host performs data transmission from/to the USB device, a serial transmission controller in the host may first read the pipe data corresponding to the endpoint from the memory. Then, the serial transmission controller reads the transfer request block from the memory according to the pipe data, and sends only one packet to the endpoint according to the transfer request block. In the existing design, when the packets of the same transfer request block are sent one by one, the transfer request block needs to be read from the memory again and again, which increases the time overhead of data transmission.

BRIEF SUMMARY

In order to solve the aforementioned problem, the present application provides a serial transmission controller and a data transmission method thereof.

An embodiment of the present application provides a serial transmission controller for processing data transmissions between a memory and an external device. The serial transmission controller includes a microcontroller, a scheduling unit, a transmission unit, and an interception control unit. The microcontroller obtains pipe data from the memory, and reads the transfer request block from the memory according to the pipe data. The scheduling unit generates a transmission request according to the pipe data and the transfer request block. The transmission unit transmits a packet of the transfer request block according to the transmission request, and correspondingly generates a transmission response. When the interception control unit receives the transmission response, and the data length that has not been transmitted in the transfer request block is greater than 0, the interception control unit notifies the transmission unit to continue to transmit a next packet of the transfer request block.

The present application also provides a data transmission method to transmit data between a memory and an external device. Pipe data are obtained from the memory, and a transfer request block is read from the memory according to the pipe data. A transmission request is generated according to the pipe data and the transfer request block. A packet of the transfer request block is transmitted according to the transmission request, and a transmission response is correspondingly generated. The transmission response includes a transmission-completion signal, a data length that has not been transmitted in the transfer request block, and a transmission message of the transfer request block. A next packet of the transfer request block is continued to transmit when the transmission response is received and the data length that has not been transmitted in the transfer request block is greater than 0.

BRIEF DESCRIPTION OF THE DRAWINGS

The present application can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the present application.

DETAILED DESCRIPTION

Certain words are used to refer to specific elements in the specification and the claims. Those with ordinary knowledge in the technical field should understand that hardware manufacturers might use different terms to refer to the same component. The specification and the claims of the present application do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field may solve the technical problem within a certain error range, and basically achieve the technical effect. In addition, the term "coupled" herein includes any direct and indirect electrical connection means. Therefore, if it is described in the text that a first device is coupled to a second device, it means that the first device may be directly electrically connected to the second device, or indirectly electrically connected to the second device through other devices or connecting means. The following descriptions are preferred ways to implement the present application. The purpose is to illustrate the spirit of the present application and not to limit the scope of protection of the present application.

The following descriptions are used to illustrate the general principles of the present application and should not be used to limit the present application. The protection scope of the present application should be determined on the basis of referring to the scope of the claims of the present application.

Figure 1:
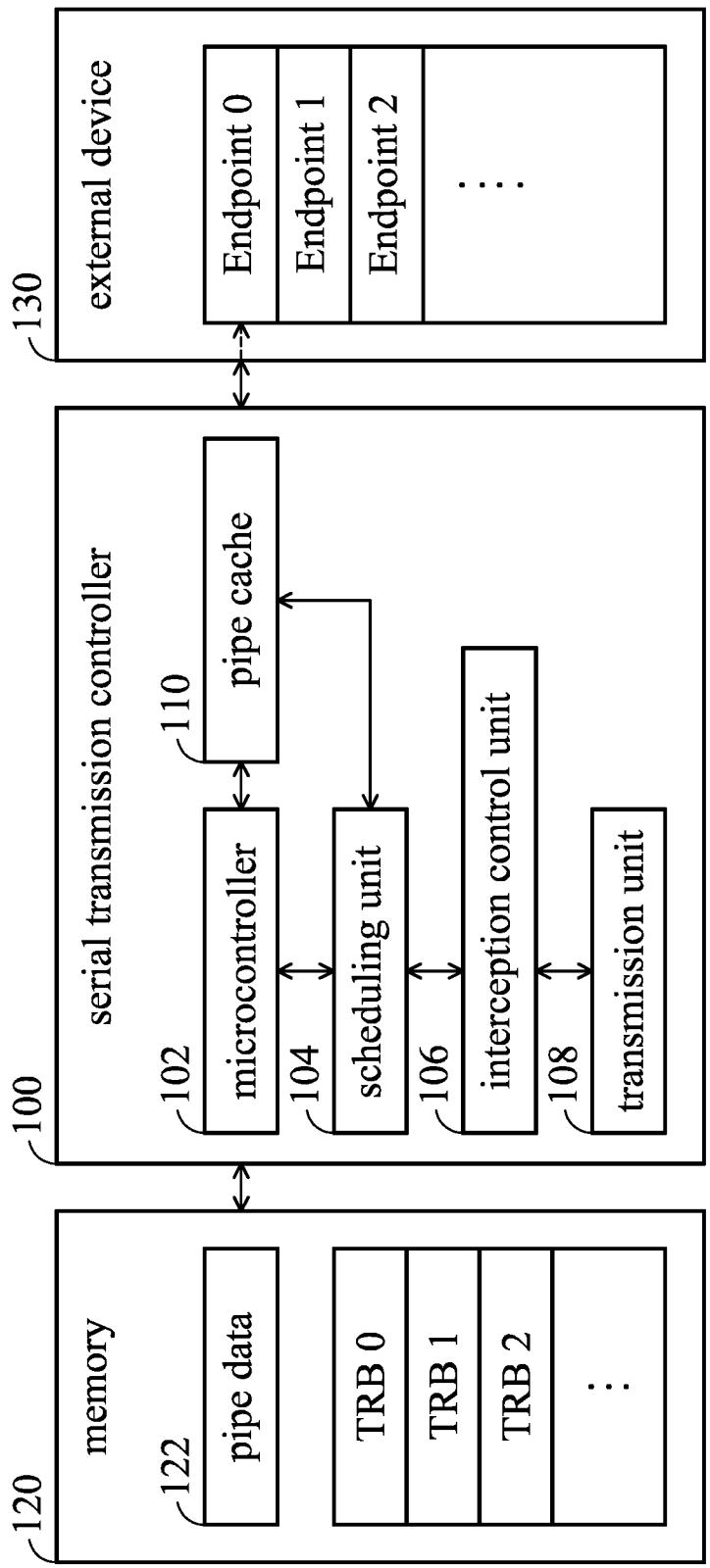
FIG. 1 is a schematic diagram of a serial transmission controller 100 for processing data transmissions between a memory 120 and an external device 130 in accordance with some embodiments of the present application.

FIG. 1 is a schematic diagram of a serial transmission controller 100 for processing data transmissions between a memory 120 and an external device 130 in accordance with some embodiments of the present application. As shown in FIG. 1, the serial transmission controller 100 is coupled between the memory 120 and the external device 130 (for example, the USB device). The serial transmission controller 100 is responsible for transmitting data from the memory 120 to the external device 130, or transmitting data from the external device 130 to the memory 120. In some embodiments, both the memory 120 and the serial transmission controller 100 are embodied in the host. In some embodiments, the serial transmission controller 100 is coupled to multiple external devices 130.

As shown in FIG. 1, the serial transmission controller 100 includes a microcontroller 102, a scheduling unit 104, an interception control unit 106, a transmission unit 108, and a pipe cache 110. The memory 120 includes pipe data 122, and a plurality of transfer request block (TRB), such as TRB 0, TRB 1, TRB 2, etc. The external device 130 includes a plurality of endpoints, such as Endpoint 0, Endpoint 1, Endpoint 2, etc.

In some embodiments, the microcontroller 102 is responsible for controlling data transmission. When the software (e.g., the driver of the external device 130 and/or the serial transmission controller 100) is ready for data transmission, the software may notify the microcontroller 102 to generate a transmission task. Specifically, the microcontroller 102 selects an external device 130 and then selects an endpoint in the external device 130 for data transmission. In some embodiments, the microcontroller 102 performs data transmission with the endpoint of the external device 130 by using the pipe data 122 corresponding to the endpoint of the external device 130.

The scheduling unit 104 obtains the pipe data 122 from the memory 120 according to the transmission task generated by the microcontroller 102. The scheduling unit 104 is responsible for overall controlling of the transmission, the control of the transmission rhythm, and determining when to do which transmissions by using transmission messages.

After getting ready for the data transmission, the scheduling unit 104 sends the relevant transmission messages to the interception control unit 106 and/or the transmission unit 108. Finally, the data transmission between the serial transmission controller 100 and the external device 130 is completed by the transmission unit 108.

An endpoint of the external device 130 may correspond to one pipe data and at least one transfer request block in the memory 120. For example, when the serial transmission controller 100 performs the data transmission between the host and the endpoint (e.g., Endpoint 0) of the external device 130, the software may store the pipe data 122 and the transfer request blocks (TRB 0, TRB 1, TRB 2, . . . ) corresponding to the endpoint (e.g., Endpoint 0) into the memory 120. When the serial transmission controller 100 performs the data transmission between the host and the other endpoint (e.g., Endpoint 1) of the external device 130, the software may store the pipe data (not shown) and the other transfer request blocks (not shown) corresponding to the other endpoint (e.g., Endpoint 1) into the memory 120. In some embodiments, the external device 130 is a USB device, and the serial transmission controller is a USB controller, but the present application is not limited thereto.

In some embodiments, when the serial transmission controller 100 transforms data between the host and the endpoint (e.g., Endpoint 0) of the external device 130, the microcontroller 102 first obtains the pipe data 122 from the memory 120. The pipe data 122 includes an address of the currently transmitted transfer request block (e.g., TRB 0, TRB 1, or TRB 2, etc.) corresponding to the pipe data 122. The pipe data 122 further includes the transmission speed of the endpoint (e.g., Endpoint 0) of the external device 130. The pipe data 122 further includes the data length of the transfer request block that should be transmitted. The pipe data 122 further includes the previous transmission message (for example, the data length that that has been transmitted, etc.) of the transfer request block (e.g., TRB 0). The pipe data 122 further includes the type of the currently transmitted transfer request block (for example, TRB 0). The pipe data 122 further includes and the maximum packet length that may be transmitted each time (corresponding to the endpoint (Endpoint 0)). In some embodiments, the pipe data 122 further includes the address of the pipe data corresponding to the next endpoint. The microcontroller 102 may obtain the pipe data of the next endpoint according to the address in the pipe data corresponding to the next endpoint.

In some embodiments, the microcontroller 102 further stores the obtained pipe data 122 into the pipe cache 110. Then, the scheduling unit 104 reads the pipe data 122 from the pipe cache 110, and then obtains the transfer request block (for example, TRB 0) from the memory 120 according to the address of the transfer request block (for example, TRB 0) stored in the pipe data 122. The scheduling unit 104 may read the pipe data 122 from the pipe cache 110 (not from the memory 120) again when there is a need to use the pipe data 122 again. Therefore, the efficiency accessing the pipe data 122 stored in the memory 120 may be increased by using the pipe cache 110.

Then, the scheduling unit 104 generates a transmission request according to the pipe data 122 and the transfer request block (e.g., TRB 0, TRB 1, or TRB 2, etc.). The scheduling unit 104 may directly send the transmission request to the transmission unit 108, or the scheduling unit 104 first sends the transmission request to the interception control unit 106, and then the interception control unit 106 sends the transmission request to the transmission unit 108. In some embodiments, the scheduling unit 104 sends a part of the transmission request to the interception control unit 106, and then the interception control unit 106 sends the part of the transmission request to the transmission unit 108. The scheduling unit 104 directly sends the other part of the transmission request to the transmission unit 108.

In some embodiments, the transmission request from the scheduling unit 104 includes the relevant information of the currently transmitted transfer request block. For example, the transmission request includes the data length, the address, the previous transmission message (for example, the data length that that has been transmitted, etc.), and the type of the currently transmitted transfer request block (for example, TRB 0). In addition, the transmission request further includes the maximum packet length that the endpoint (for example, Endpoint 0) can transmit each time.

After receiving the transmission request directly or indirectly from the scheduling unit 104, the transmission unit 108 completes the transmission of a packet of the current transfer request block (for example, TRB 0) according to the transmission request, and generates a transmission response. The transmission response includes a transmission-completion signal, a data length that has not been transmitted in the transfer request block, and a transmission message of the transfer request block. Then, the transmission unit 108 sends the transmission response to the interception control unit 106. The transmission-completion signal in the transmission response indicates that the data transmission between the host and the endpoint (for example, Endpoint 0) of the external device 130 has been completed. The transmission message of the transfer request block in the transmission response includes the data length that has been transmitted in the transfer request block (for example, TRB 0). The formula for calculating the data length that has been transmitted in the transfer request block is len_sent=len_1st+len_packet. The len_sent is the data length that has been transmitted in the transfer request block. The len_1st is the length of the data, which has been transmitted last time, of the transfer request block. The len_packet is the packet length that is transmitted this time. As for how to transmit data directly between the host and the endpoint of the external device 130 according to the address of the transfer request block and the maximum packet length that the endpoint may transmit each time, it is the common knowledge of those skilled in the art and will not be repeated here.

The transmission unit 108 may obtain the data length that should be transmitted in the transfer request block (for example, TRB 0) from the transmission request, and obtain the data length that has been transmitted in the transfer request block from the transmission message of the transfer request block. After that, the transmission unit 108 uses the formula len=len1−len2 to calculate the data length that has not been transmitted in the transfer request block. The len1 is the data length that should be transmitted. The len2 is the data length that has been transmitted. The len is the data length that has not been transmitted in the transfer request block.

When the interception control unit 106 receives the transmission response from the transmission unit 108, and determines that the data length that has not been transmitted in the currently transmitted transfer request block (TRB 0) is greater than 0, the interception control unit 106 further determines whether the current transmission meets an interception condition. If the interception condition is met, the interception control unit 106 intercepts the transmission response from the transmission unit 108 (for example, does not send the transmission response to the scheduling unit 104), and transmits another transmission request including the transmission message of the transfer request block to the transmission unit 108. Then the transmission unit 108 continues to transmit the next packet of the transfer request block according to the another transmission request.

In some embodiments, the interception conditions are as follows. 1) The currently transmitted transfer request block (for example, TRB 0) is a normal transfer request block. 2) The previously transmitted packet of the currently transmitted transfer request block (TRB 0) has been transmitted successfully. 3) When the interception control unit 106 receives the transmission-completion signal from the transmission unit 108, the transmission unit 108 is in the preset transmission period, which means the transmission unit 108 still have time to do a next packet transmission. 4) The maximum packet length of the endpoint corresponding to the current transmission is greater than the preset packet length. 5) The number of interception that the interception control unit 106 has intercepted is less than or equal to the preset number of interception.

When the data length that has not been transmitted in the currently transmitted transfer request block (for example, TRB 0) is greater than 0, and interception conditions 1 to 5 are all met, the interception control unit 106 intercepts the transmission response from the transmission unit 108. In some embodiments, the data transmission between the memory 120 and the external device 130 may be a periodic transmission or an asynchronous transmission. The interception conditions 1 to 5 occur when the serial transmission controller 100 performs an asynchronous transmission.

In the determination of the interception condition 1, the interception control unit 106 obtains the type of the transfer request block (e.g., TRB 0) from the transmission request from the scheduling unit 104. In some embodiments, the type of the transfer request block (e.g., TRB 0) may be a normal type, a setup stage type, a data stage type, a status state type, an isochronous type, a link type, or an event data type, etc. When the type of the transfer request block is the normal type, the interception control unit 106 determines that the interception condition 1 is met.

In some embodiments, when the host outputs the data to the external device 130, if the external device 130 receives the packet from the serial transmission controller 100 successfully, the external device 130 correspondingly returns an acknowledgement message to the serial transmission controller 100. If the serial transmission controller 100 receives the acknowledgement message from the external device 130 successfully, the interception control unit 106 determines that the interception condition 2 is met.

In some embodiments, when the external device 130 outputs the data to the host, if the serial transmission controller 100 receives the packet from the external device 130 successfully, the serial transmission controller 100 performs a cyclic redundancy check (CRC) on the packet. If the result of CRC is correct, after the serial transmission controller 100 transmits the acknowledgement message to the external device 130, the interception control unit 106 determines that the interception condition 2 is met.

In some embodiments, the micro-frame is used during the transmission of USB. Micro-frame is a period, for example, every 125 microseconds (us) is a micro-frame. In the specification of USB, data transmission cannot be carried out across micro-frame. Therefore, if it is still within a preset transmission period when the interception control unit 106 receives the transmission response, which means that the transmission unit 108 can still transmit the next packet in the remaining time of the current micro-frame, the interception control unit 106 determines that the interception condition 3 is met.

Each endpoint (e.g., Endpoint 0, Endpoint 1, Endpoint 2, etc.) of the external device 130 may have different maximum packet lengths that can be transmitted each time according to its transmission type. For example, when the transmission type of an endpoint is full speed bulk out, the maximum packet length, which can be transmitted each time, of the endpoint is up to 64 bytes. When the transmission type of an endpoint is high-speed bulk out, the maximum packet length of the endpoint that can be transmitted each time is up to 512 bytes. If the default packet length is set to 256 bytes, the interception control unit 106 does not intercept any packet with the transmission type of full speed bulk out. In other words, the purpose of not intercepting packets of smaller transfer request blocks may be achieved by using the interception condition 4.

In the interception condition 5, when the number of interception that the interception control unit 106 has continuously intercepted the current transfer request block is greater than the preset number of interception, the interception may be stopped. The aforementioned number of interception is the number that the interception control unit 106 intercepts the transmission response generated by the transmission unit 108 when sending the packet of the current transfer request block. In some embodiments, the preset number of interception is 3.

For example, when the number that the interception control unit 106 intercepts the transmission response from the transmission unit 108 is still less than or equal to 3, the interception control unit 106 determines that the interception condition 5 is met and continuous to intercept the next transmission response. When the number that the interception control unit 106 intercepts the transmission response from the transmission unit 108 is greater than 3, the interception control unit 106 determines that the interception condition 5 is not met and stops interception.

Figure 2:
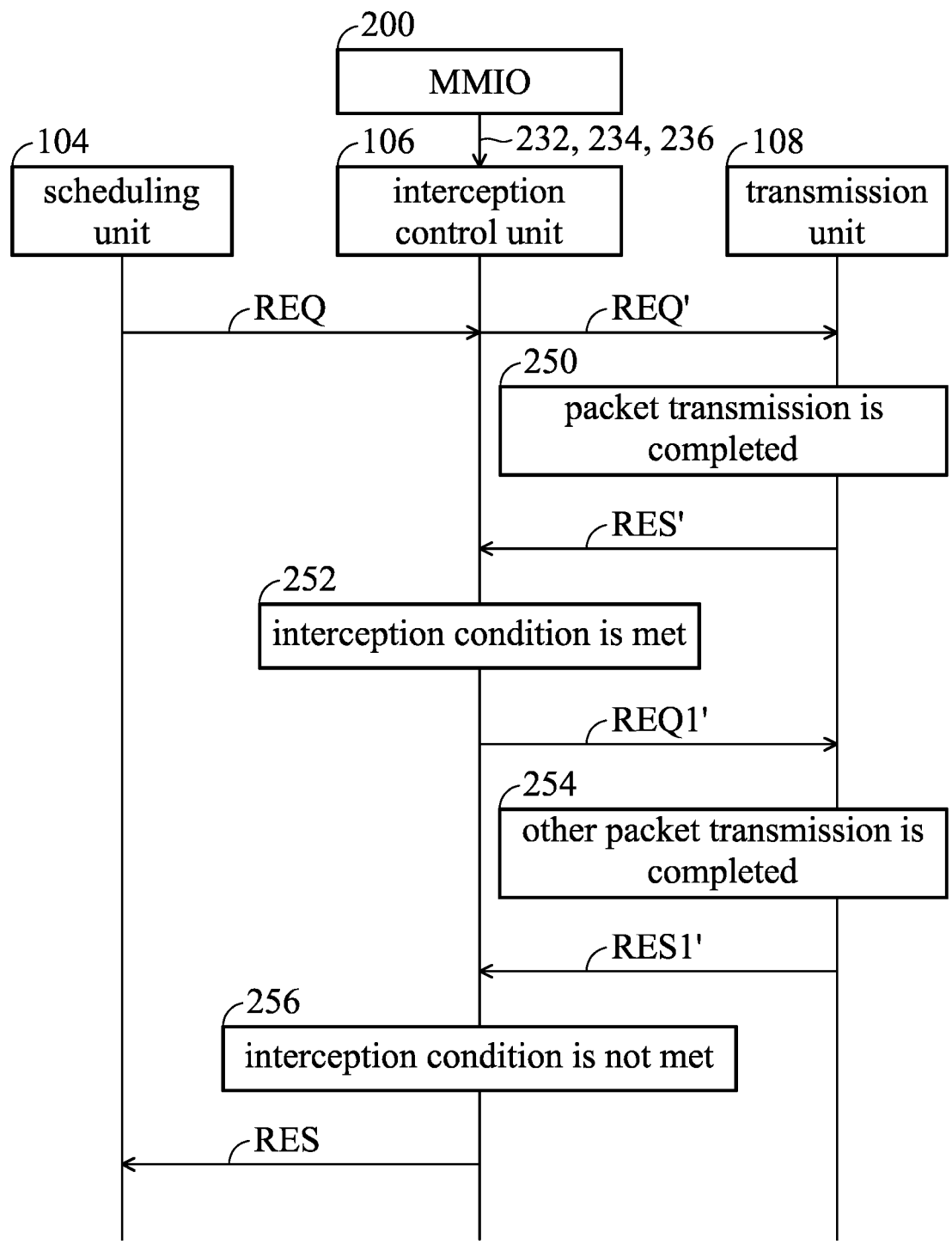
FIG. 2 is a schematic diagram of signal transmission among a scheduling unit 104, an interception control unit 106, and the transmission unit 108 of the serial transmission controller 100 in FIG. 1 in accordance with some embodiments of the present application.

FIG. 2 is a schematic diagram of signal transmission among a scheduling unit 104, an interception control unit 106, and the transmission unit 108 of the serial transmission controller 100 in FIG. 1 in accordance with some embodiments of the present application. As shown in FIG. 2, the system processor (not shown) transmits an enable signal 232, a number of interception setting signal 234, and a preset packet-length interception-setting signal 236 to the interception control unit 106 through a memory-mapped input-output (MMIO) 200.

The enable signal 232 is used to enable or disable the interception function of the interception control unit 106. In some embodiments, when the enable signal 232 is 1, the interception function of the interception control unit 106 is enabled. When the enable signal 232 is 0, the interception function of the interception control unit 106 is disabled. The number of interception setting signal 234 is used to set the number of interception used in determining the interception condition 5, so that the interception control unit 106 can determine if the interception condition 5 is met. The preset packet-length interception-setting signal 236 is used to set the preset packet length used in determining the interception condition 4.

As shown in FIG. 2, the scheduling unit 104 sends a transmission request REQ to the interception control unit 106 according to the pipe data 122, then the interception control unit 106 sends a transmission request REQ' to the transmission unit 108 correspondingly. In some embodiments, the transmission requests REQ and REQ' have the same content, which is the relevant information of the currently transmitted transfer request block. For example, both of the transmission requests REQ and REQ' include the data length, the address, the previous transmission message (including the data length that has been transmitted, etc.), and the type (for example, the signal TRB_TYPE) of the currently transmitted transfer request block (for example, TRB 0). Both of the transmission requests REQ and REQ' further include the maximum packet length (for example, the signal ASYEP_MAXPSZ) that the endpoint (e.g. Endpoint 0) can transmit each time, and a transmission start flag ASYEP_VALID (the transmission request REQ' includes a transmission start flag ASYEP_VALID_TRM). In some embodiments, the scheduling unit 104 directly sends the transmission request REQ to the transmission unit 108, but the present application is not limited thereto.

In some embodiments, the interception control unit 106 determines if the interception condition 4 is met (that is, determining whether the maximum packet length of the endpoint corresponding to the current transmission is greater than a preset packet length) according to the maximum packet length (e.g., the signal ASYEP_MAXPSZ) that the endpoint (Endpoint 0) can transmit each time. The maximum packet length that the endpoint can transmit each time includes in the transmission request. The interception control unit 106 determines if the interception condition 1 is met (that is, determining whether the currently transmitted transfer request block is a normal transfer request block) according to the type (for example, the signal TRB_TYPE) of the currently transmitted transfer request block.

Then, after receiving the transmission request REQ from the scheduling unit 104 or the transmission request REQ' from the interception control unit 106, the transmission unit 108 performs the packet transmission of the currently transmitted transfer request block (as shown in the block 250). After that, the transmission unit 108 correspondingly sends a transmission response RES' to the interception control unit 106. The transmission response RES' includes a transmission-completion signal ASYEP_TERM, which is used to determine whether the packet of the current transfer request block (e.g., TRB 0) is successfully transmitted (e.g., the signal TRANS_SUCCESS). The transmission response RES' further includes a data length that has not been transmitted in the current transfer request block (e.g., the signal NOT_FINISH_LENGTH). The transmission response RES' further includes information used to determine whether it is still within a preset transmission period (e.g., the signal PRESOF_MEET) when the packet transmission is completed. The transmission response RES' further includes a transmission message ASYEP_* of the current transfer request block (TRB 0). In some embodiments, the transmission message ASYEP_* includes the data length that has been transmitted in the current transfer request block (e.g., TRB 0).

The interception control unit 106 determines whether the interception condition 2 is met according to the information about whether the packet of the current transfer request block (e.g., TRB 0) has been successfully transmitted (e.g., the signal TRANS_SUCCESS). Determining whether the interception condition 2 is met means determining whether the previously transmitted packet of the currently transmitted transfer request block (e.g., TRB 0) has been successfully transmitted.

After receiving the transmission response RES' from the transmission unit 108, according to whether it is still within a preset transmission period (e.g., the signal PRESOF_MEET) when the packet transmission is completed, the interception control unit 106 may determine whether the interception condition 3 is met. the interception control unit 106 determines whether the interception condition 3 is met by determining whether the transmission unit 108 can still continue to transmit another packet of the transfer request block.

When the interception conditions 1 to 5 are all met, the interception control unit 106 determines that the interception condition is met (as shown in the block 252). Then, the interception control unit 106 generates other transmission request REQ1' according to the transmission response RES', and sends the other transmission request REQ1' to the transmission unit 108. After the transmission unit 108 receives the other transmission request REQ1', the transmission unit 108 completes the other packet transmission of the currently transmitted transfer request block (as shown in the block 254).

Similarly, after the transmission unit 108 completes the transmission of the other packet of the currently transmitted transfer request block (e.g., TRB 0), the transmission unit 108 sends other transmission response RES1' to the interception control unit 106. Then, the interception control unit 106 determines whether the interception condition is met according to the other transmission response RES1' (as shown in the block 256). When the determination result is "No" (that is, the interception condition is not met), the interception control unit 106 generates a final transmission response RES according to the other transmission response RES1', and sends the final transmission response RES to the scheduling unit 104. In some embodiments, the final transmission response RES is the same as the transmission response RES1'. The method for determining whether the interception condition is met according to the other transmission response RES1' is the same as the method for determining whether the interception condition is met according to the transmission response RES', and the present application will not be repeated herein.

After receiving the final transmission response RES, the scheduling unit 104 updates the pipe data 122 stored in the pipe cache 110 according to the final transmission response RES (for example, according to the transmission message of the currently transmitted transfer request block in the final transmission response RES), and stores the updated pipe data 122 into the memory 120. Thereby the data transmission between the host and the endpoint (for example, Endpoint 0) of the external device 130 is completed.

Figure 3:
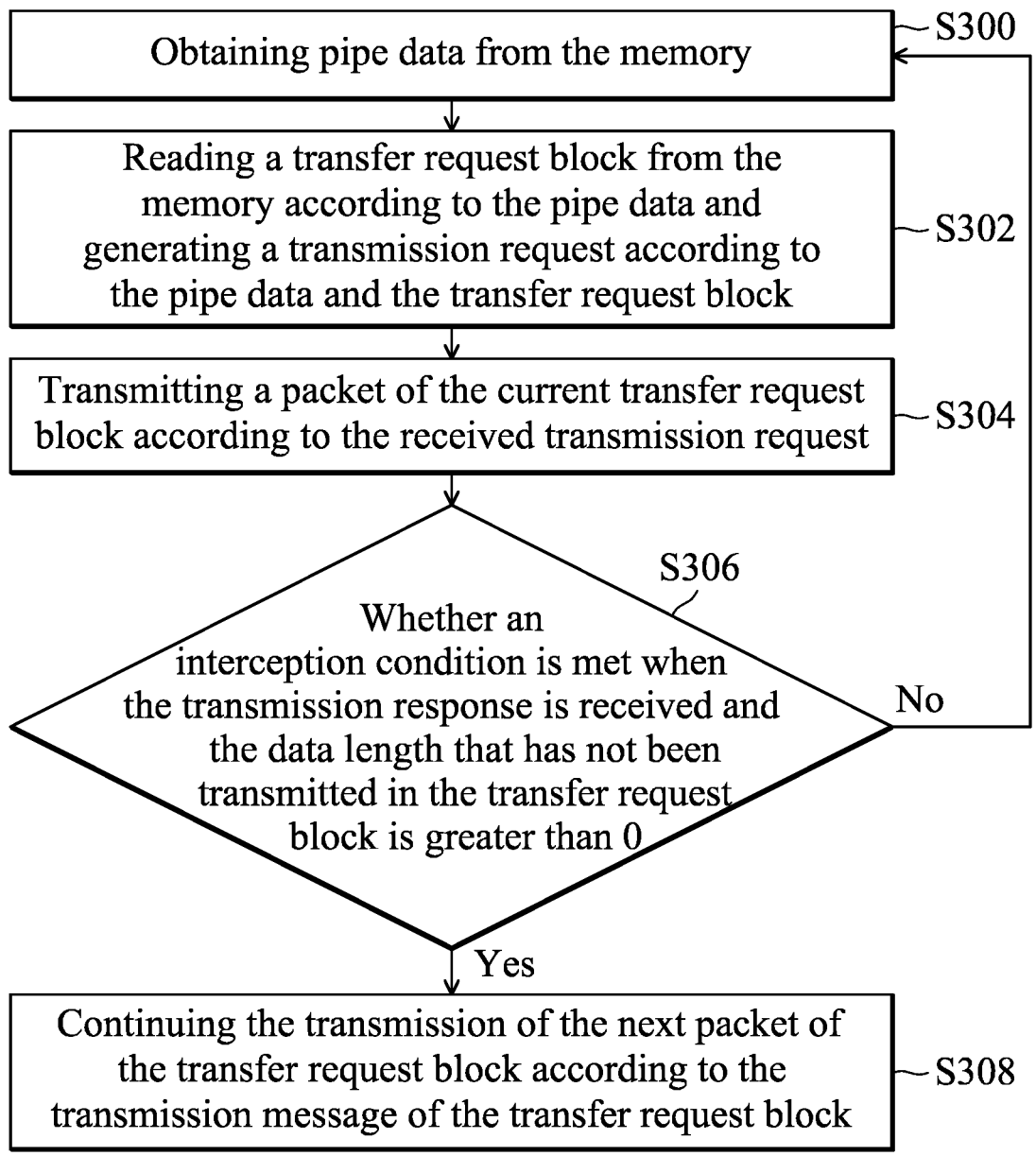
FIG. 3 is a flow chart of a data transmission method in accordance with some embodiments of the present application.

FIG. 3 is a flow chart of a data transmission method in accordance with some embodiments of the present application. Please refer to FIG. 1, FIG. 2, and FIG. 3 at the same time. As shown in FIG. 3, the microcontroller 102 first obtains the pipe data 122 from the memory 120 corresponding to the endpoint (e.g., Endpoint 0) of the external device 130 (as shown in step S300). Then, the scheduling unit 104 reads the current transfer request block (e.g., transfer request block TRB 0) from the memory 120, and generates a transmission request correspondingly (e.g., the transmission request REQ in FIG. 2) (as shown in step S302). After that, the scheduling unit 104 sends the transmission request to the transmission unit 108 through the interception control unit 106.

Then, in step S304, the transmission unit 108 transmit a packet of the current transfer request block according to the received transmission request. In addition, after transmitting the packet of the current transfer request block, the transmission unit 108 generates a transmission-completion signal (for example, the transmission-completion signal ASYEP_TERM included in the transmission response RES' in FIG. 2) and a transmission message (for example, the transmission message ASYEP_* included in the transmission response RES' in FIG. 2) correspondingly. Then, the transmission unit 108 sends the transmission-completion signal and the transmission message of the current transfer request block to the interception control unit 106.

Then, in step S306, the interception control unit 106 determines whether an interception condition is met when the data length that has not been transmitted in the current transfer request block is greater than 0. When the interception control unit 106 determines that the interception condition is met (the interception conditions 1 to 5 are all met), the serial transmission controller 100 continues to transmit the next packet of the transfer request block according to the transmission message of the transfer request block. Specifically, the interception control unit 106 generates another transmission request (e.g., the other transmission request REQ1' in FIG. 2) according to the transmission message of the transfer request block, and sends the another transmission request to the transmission unit 108. After that, the transmission unit 108 transmits the next packet of the transfer request block according to the another transmission request (as shown in step S308), that is, the transmission unit 108 goes back to step S304.

In step S306, when the interception control unit 106 determines that the data length that has not been transmitted in the transfer request block is equal to 0, or the interception condition is not met, the interception control unit 106 sends the transmission response (for example, the final transmission response RES in FIG. 2) to the scheduling unit 104. The interception condition is not met means at least one of the interception conditions 1 to 5 is not met. The scheduling unit 104 updates the pipe data 122 according to the transmission message of the transfer request block included in the transmission response to end up the transmission of the current transfer request block. After that, the microcontroller 102 in FIG. 1 executes step S300 again to read the pipe data 122 corresponding to other endpoint (e.g., Endpoint 1), so as to transmit data of the other endpoint.

Figure 4:
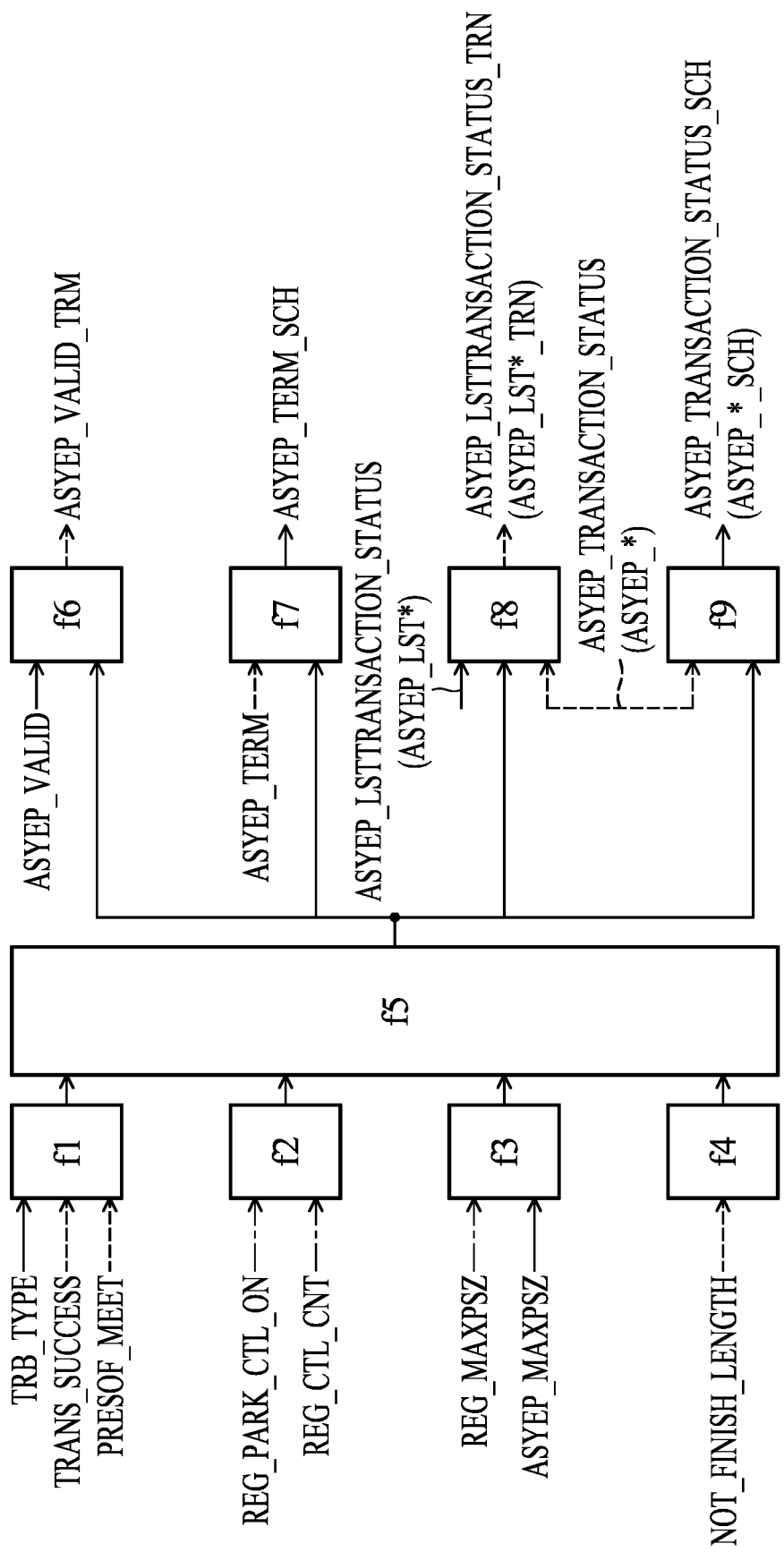
FIG. 4 is a schematic structural diagram of the interception control unit 106 of the serial transmission controller 100 in accordance with some embodiments of the present application.

FIG. 4 is a schematic structural diagram of the interception control unit 106 of the serial transmission controller 100 in accordance with some embodiments of the present application. As shown in FIG. 4, the interception control unit 106 includes a digital circuit f1, a digital circuit f2, a digital circuit f3, a digital circuit f4, a digital circuit f5, a digital circuit f6, a digital circuit f7, a digital circuit f8, and a digital circuit f9. In one embodiment, each of the digital circuits f1 to f9 is implemented by a combination digital circuit.

As shown in FIG. 4, the signal REG_PARK_CTL_ON (the signal 232 in FIG. 2), the signal REG_CTL_CNT (the signal 234 in FIG. 2), and the signal REG_MAXPSZ (the signal 236 in FIG. 2) are all configured through the memory-mapped input-output (MMIO) 200. In addition, the signal REG_PARK_CTL_ON, the signal REG_CTL_CNT, and the signal REG_MAXPSZ are represented by first dashed arrows, each of which is composed of an alternating dotted line (that is, each long dot is followed by a short dot). All signals from or directed to the transmission unit 108 (e.g., the signal TRANS_SUCCESS, the transmission-completion signal ASYEP_TERM, etc.) are represented by second dashed arrows, which are composed of long dotted lines (as shown in FIG. 4). All signals from or directed to the scheduling unit 104 (e.g., the transmission start flag ASYEP_VALID, the signal ASYEP_MAXPSZ, etc.) are represented by solid arrows.

The digital circuit f1 receives the signal TRB_TYPE from the scheduling unit 104, the signals TRANS_SUCCESS and PRESOF_MEET from the transmission unit 108. The signal TRB_TYPE includes the type of the currently transmitted transfer request block (e.g., TRB 0). The signal TRANS_SUCCESS includes information about whether the packet of the current transfer request block (e.g., TRB 0) has been successfully transmitted. The signal PRESOF_MEET includes information about whether it is still within a preset transmission period when the packet transmission is completed.

When the current transfer request block is a normal transfer request block, the signal TRB_TYPE is at a high voltage level. When the packet transmission of the current transfer request block (e.g., TRB 0) is completed with no error, the signal TRANS_SUCCESS is at a high voltage level. If it is still within a preset transmission period when the interception control unit 106 receives the transmission-completion signal ASYEP_TERM from the transmission unit 108, the signal PRESOF_MEET is at a high voltage level. The digital circuit f1 executes an AND operation on the signal TRB_TYPE, the signal TRANS_SUCCESS, and the signal PRESOF_MEET. In other words, when the interception conditions 1 to 3 are all met at the same time, the digital circuit f1 outputs the high voltage level.

The digital circuit f2 receives the signal REG_PARK_CTL_ON (the signal 232 in FIG. 2), and the signal REG_CTL_CNT (the signal 234 in FIG. 2). As aforementioned, the signal REG_PARK_CTL_ON (the signal 232 in FIG. 2) is used to enable the interception function of the interception control unit 106. The signal REG_CTL_CNT (the signal 234 in FIG. 2) is used to set the number of interception used in determining the interception condition 5.

When the digital circuit f2 receives the signal REG_PARK_CTL_ON with high voltage level, the digital circuit f2 enables the interception function of the interception control unit 106. In some embodiments, the interception control unit 106 includes a counter (not shown in the figure, the counter's initial value is 0) that is used to calculate the number of interception of the current transfer request block. When the signal REG_PARK_CTL_ON is at the high voltage level, and the number of interception is still less than or equal to the preset number of interception (REG_CTL_CNT), the digital circuit f2 outputs high voltage level. In other words, when the interception function of the interception control unit 106 is enabled and the interception condition 5 is met at the same time, the digital circuit f2 outputs the high voltage level. It is noted that when the scheduling unit 104 transmits packet of other transfer request block, the counter of the interception control unit 106 will be reset to 0.

The digital circuit f3 receives the signal REG_MAXPSZ (the signal 236 in FIG. 2) from MMIO 200 in FIG. 2, and the signal ASYEP_MAXPSZ from the scheduling unit 104. The signal REG_MAXPSZ (the signal 236 in FIG. 2) is used in determining the interception condition 4. The signal ASYEP_MAXPSZ is the maximum packet length of the endpoint corresponding to the current transmission. When the maximum packet length of the endpoint corresponding to the current transmission ASYEP_MAXPSZ is greater than the preset packet length in the signal REG_MAXPSZ, the digital circuit f3 outputs high voltage level. In other words, when the interception condition 4 is met, the digital circuit f3 outputs the high voltage level.

The digital circuit f4 receives the signal NOT_FINISH_LENGTH from the transmission unit 108. The signal NOT_FINISH_LENGTH is the data length that has not been transmitted in the currently transmitted transfer request block (e.g., TRB 0). When the data length that has not been transmitted in the currently transmitted transfer request block (e.g., TRB 0) is greater than 0, the digital circuit f4 outputs the high voltage level.

The digital circuit f5 receives the output signals from the digital circuits f1 to f4, and executes an AND operation on the output signals from the digital circuits f1 to f4. When the output signals from the digital circuits f1 to f4 are all at the high voltage level, the digital circuit f5 outputs the high voltage level. In other words, when the data length that has not been transmitted in the currently transmitted transfer request block (e.g., TRB 0) is greater than 0, and the interception conditions 1 to 5 are all met, the digital circuit f5 outputs the high voltage level.

The digital circuits f6 to f9 perform different actions according to the output signal from the digital circuit f5. For example, when the digital circuit f5 outputs the high voltage level, the transmission start flag ASYEP_VALID_TRM output by the digital circuit f6 is the transmission start flag generated by the interception control unit 106. When the digital circuit f5 outputs the low voltage level (the interception condition is not met), the transmission start flag ASYEP_VALID_TRM output by the digital circuit f6 is the transmission start flag ASYEP_VALID from the scheduling unit 104.

When the digital circuit f5 outputs the high voltage level (the interception condition is met), the transmission-completion signal ASYEP_TERM_SCH output by the digital circuit f7 is zero. When the digital circuit f5 outputs the low voltage level (the interception condition is not met), the transmission-completion signal ASYEP_TERM_SCH output by the digital circuit f7 is the transmission-completion signal ASYEP_TERM from the transmission unit 108.

When the digital circuit f5 outputs the high voltage level (the interception condition is met), the transmission message ASYEP_LSTTRANSACTION_STATUS_TRN (that is, ASYEP_LST*_TRN) output by the digital circuit f8 is the previous transmission message generated when transmitting the previous packet (e.g., the transmission message ASYEP_TRANSACTION_STATUS (that is, ASYEP_*)). In one embodiment, the previous transmission message is stored in the interception control unit 106. When the digital circuit f5 outputs the low voltage level (the interception condition is not met), the transmission message ASYEP_LSTTRANSACTION_STATUS_TRN (that is, ASYEP_LST*_TRN) output by the digital circuit f8 is the transmission message ASYEP_LSTTRANSACTION_STATUS (that is, ASYEP_LST*) from the scheduling unit 104.

When the digital circuit f5 outputs the high voltage level (the interception condition is met), the transmission message ASYEP_TRANSACTION_STATUS_SCH (that is, ASYEP_*_SCH) output by the digital circuit f9 is the previous transmission message (e.g., the transmission message ASYEP_LSTTRANSACTION_STATUS (that is, ASYEP_LST*)). The previous transmission message is stored in the interception control unit 106 when the transmission start flag ASYEP_VALID from the scheduling unit 104 is changed from low voltage level to high voltage level. When the digital circuit f5 outputs the low voltage level (the interception condition is not met), the transmission message ASYEP_TRANSACTION_STATUS_SCH (that is, ASYEP_*_SCH) output by the digital circuit f9 is the transmission message ASYEP_TRANSACTION_STATUS (that is, ASYEP_*) from the transmission unit 108.

Figure 5:
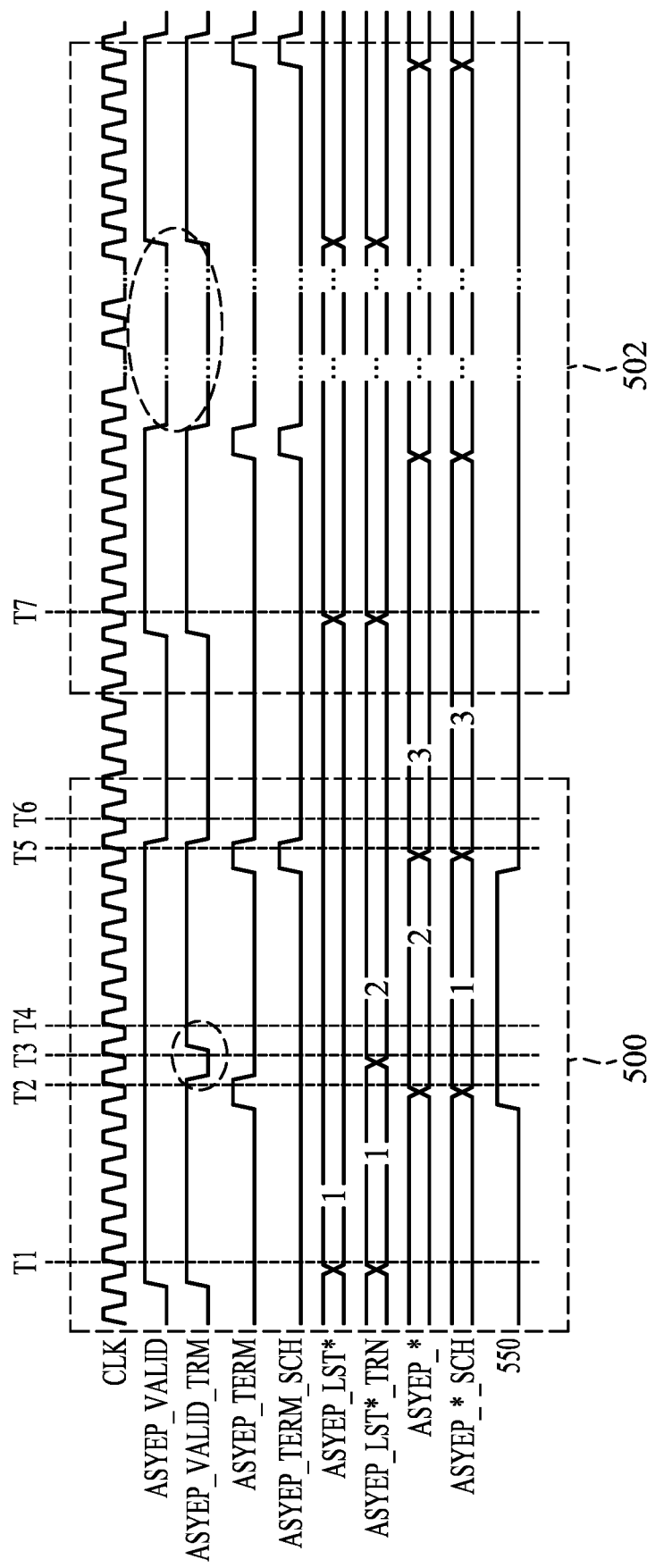
FIG. 5 is a waveform diagram of the signal transmission in FIG. 2 in accordance with some embodiments of the present application.

FIG. 5 is a waveform diagram of the signal transmission in FIG. 2 in accordance with some embodiments of the present application. FIG. 5 discloses the timing diagram of the clock CLK, the transmission start flag ASYEP_VALID and ASYEP_VALID_TRM, the transmission-completion signal ASYEP_TERM and ASYEP_TERM_SCH, the transmission message ASYEP_LST*, ASYEP_LST*_TRN, ASYEP_*, and ASYEP_*_SCH, and the interception state signal 550. FIG. 5 includes a timing diagram of a period 500 when the interception function is turned on, and a timing diagram of a period 502 when the interception function is turned off.

As shown in FIGS. 2 and 5, at the time T1, the scheduling unit 104 sends the transmission request REQ to the interception control unit 106, and the interception control unit 106 sends the transmission request REQ' to the transmission unit 108. Therefore, the transmission start flag ASYEP_VALID (included in the transmission request REQ) and ASYEP_VALID_TRM (included in the transmission request REQ') change from the low voltage level to the high voltage level. At the time T1, the scheduling unit 104 sends the transmission message ASYEP_LST* (including the previous transmission message of the currently transmitted transfer request block (e.g., TRB 0), that is, data 1 in FIG. 5) to the interception control unit 106. Since this is the first transmission of the currently transmitted transfer request block, the interception state signal 550 is at the low voltage level, and the transmission message ASYEP_LST*_TRN output by the digital circuit f8 in FIG. 4 is the transmission message ASYEP_LST* from the scheduling unit 104. The transmission message ASYEP_LST*_TRN also includes the data 1 in the transmission message ASYEP_LST*.

From the time T1 to T2, the transmission unit 108 completes the transmission of a packet of the currently transmitted transfer request block (e.g., TRB 0). At the time T2, the transmission unit 108 correspondingly sends the transmission-completion signal ASYEP_TERM (from the low voltage level to the high voltage level) and the transmission message ASYEP_*(including the transmission message of the currently transmitted transfer request block (e.g., TRB 0), that is, data 2 in FIG. 5).

The interception control unit 106 determines that the interception condition is met at the time T2, thus the interception state signal 550 changes from the low voltage level to the high voltage level. At the time T2, when the interception condition is met, the interception control unit 106 changes the transmission start flag ASYEP_VALID_TRM from high voltage level to low voltage level, and sends the transmission message ASYEP_*_SCH whose content includes the data 1 to the scheduling unit 104. At the time T2, since the transmission-completion signal ASYEP_TERM_SCH received by the scheduling unit 104 is at the low voltage level, the scheduling unit 104 does not perform any operation after receiving the transmission message ASYEP_*_SCH.

At the time T3, the interception control unit 106 updates the content of the transmission message ASYEP_LST*_TRN as the data 2 to the content of the transmission message ASYEP_*. Then, the interception control unit 106 sends the transmission message ASYEP_LST*_TRN to the transmission unit 108, and changes the transmission start flag ASYEP_VALID_TRM from the low voltage level to the high voltage level. After the transmission unit 108 receives the transmission start flag ASYEP_VALID_TRM and the transmission message ASYEP_LST*_TRN, the transmission unit 108 starts the transmission of other packet of the currently transmitted transfer request block (e.g., TRB 0) at the time T4.

At the time T5, the transmission unit 108 transmits the other packet of the currently transmitted transfer request block (e.g., TRB 0). Then the transmission unit 108 sends the transmission-completion signal ASYEP_TERM and the transmission message ASYEP_* to the interception control unit 106 again. Sending the transmission-completion signal ASYEP_TERM means changing the transmission-completion signal ASYEP_TERM from the low voltage level to the high voltage level. The transmission message ASYEP_* is the data 3 in FIG. 5, which is the transmission message of the currently transmitted transfer request block (e.g., TRB 0). The interception control unit 106 determines that the interception condition is not met at the time T5, therefore the interception state signal 550 changes from the high voltage level to the low voltage level to stop the interception.

At the time T5, since the interception condition is not met, the interception control unit 106 updates the content of the transmission message ASYEP_*_SCH to the data 3 according to the content of the transmission message ASYEP_*. Then, the interception control unit 106 generates the transmission-completion signal ASYEP_TERM_SCH according to the transmission-completion signal ASYEP_TERM (that is, the transmission-completion signal ASYEP_TERM_SCH changes from the low voltage level to the high voltage level). After that, the interception control unit 106 sends the transmission message ASYEP_*_SCH whose content includes the data 3 and the transmission-completion signal ASYEP_TERM_SCH to the scheduling unit 104. At the time T6, the transmission start flags ASYEP_VALID and ASYEP_VALID_TRM are both changed from the high voltage level to the low voltage level, indicating that the current transmission of the currently transmitted transfer request block (e.g., TRB 0) is done. After the time T6, the interception function of the interception control unit 106 is turned off.

At the time T7, the scheduling unit 104 sends the transmission start flag ASYEP_VALID to the interception control unit 106 again, and the interception control unit 106 sends the transmission start flag ASYEP_VALID_TRM (which is the same as the transmission start flag ASYEP_VALID) to the transmission unit 108. At the time T7, the scheduling unit 104 sends out the transmission message ASYEP_LST* (including the previous transmission message of the currently transmitted transfer request block (e.g., TRB 1)). Since the interception function is turned off, the transmission message ASYEP_LST*_TRN sent from the interception control unit 106 to the transmission unit 108 is the same as the transmission message ASYEP_LST*.

After the transmission unit 108 completes the transmission of a packet of the currently transmitted transfer request block (e.g., TRB 1), the transmission unit 108 outputs the transmission-completion signal ASYEP_TERM to the interception control unit 106 again. Since the interception condition is not met, the interception function is turned off, and the interception control unit 106 directly sends the transmission-completion signal ASYEP_TERM_SCH to the scheduling unit 104 to end up the current packet transmission. In the period 502, since the interception function is turned off, the interception state signal 550 remains at the low voltage level.

In some embodiments, in the period 502 when the interception function is disabled, the data transmission interval between two packets is 900 nanoseconds (that is, at the dotted circle in the period 502). In the period 500 when the interception function is enabled, the data transmission interval between two packets is 280 nanoseconds (that is, at the dotted circle in the period 500).

In other words, the data transmission interval of the period 500 with the interception function enabled is 620 nanoseconds faster than the data transmission interval of the period 502 with the interception function disabled. That is, the data transmission efficiency in the period 500 with the interception function enabled is nearly 3 times better than that in the period 502 with the interception function disabled.

The serial transmission controller 100 and the data transmission method thereof proposed by the present application may continuously transmit multiple packets of the same transfer request block, thereby reduce the time of repeatedly accessing the memory 120 for the transfer request block and the pipe data 122, and improve the transmission efficiency. When multiple endpoints of an external device 130 perform data input (IN) and data output (OUT) at the same time, the serial transmission controller 100 and the method for data transmission provided by the present application may reduce the number of switching between the endpoints. Therefore, the time of accessing the memory 120 for the transfer request block and the pipe data 122 is reduced.

In addition, the serial transmission controller 100 of the present application and the data transmission method thereof can flexibly adjust the packet length of the interception condition and the number of interception according to the preset register parameters (e.g., the signal REG_CTL_CNT and the signal REG_MAXPSZ).

In the several embodiments provided by the present application, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present application may be integrated into one processing unit. Alternatively, each unit may exists alone physically, or two or more units may be integrated into one unit. The above-mentioned integrated unit can be realized either in the form of hardware or in the form of a software functional unit.

Although the present application is disclosed above in the preferred embodiment, it is not intended to limit the scope of the present application. Anyone with ordinary knowledge in the relevant technical field can make changes and modifications without departing from the spirit and scope of the present application. Therefore, the protection scope of the present application shall be determined by the scope of the claims.

What is claimed is:

1. A serial transmission controller for processing data transmissions between a memory and an external device, comprising:
   a microcontroller, configured to obtain pipe data from the memory, and read a transfer request block from the memory according to the pipe data;
   a scheduling unit, configured to generate a transmission request according to the pipe data and the transfer request block;
   a transmission unit, configured to transmit a packet of the transfer request block according to the transmission request, and correspondingly generate a transmission response;
   wherein the transmission response comprises a transmission-completion signal, a data length that has not been transmitted in the transfer request block, and a transmission message of the transfer request block; and
   an interception control unit, configured to receive the transmission response;
   wherein when the interception control unit receives the transmission response, and the data length that has not been transmitted in the transfer request block is greater than 0, the interception control unit notifies the transmission unit to continue to transmit a next packet of the transfer request block.

2. The serial transmission controller as claimed in claim 1, wherein the transmission message of the transfer request block comprises a data length that has been transmitted in the transfer request block, and the transfer request block comprises a data length that should be transmitted; wherein the transmission unit is configured to use the formula len=len1−len2 to calculate the data length that has not been transmitted in the transfer request block, and send the data length that has not been transmitted to the interception control unit, wherein len1 is the data length that should be transmitted, len2 is the data length that has been transmitted, and len is the data length that has not been transmitted in the transfer request block; wherein the data length that should be transmitted is stored in the pipe data by a driver of the microcontroller when the serial transmission controller processes the data transmissions between the memory and the external device.

3. The serial transmission controller as claimed in claim 1, further comprising: a pipe cache, wherein the microcontroller stores the pipe data into the pipe cache.

4. The serial transmission controller as claimed in claim 1, wherein the transmission request comprises an address of the transfer request block; the transmission unit reads the transfer request block according to the address of the transfer request block, reads the packet of the transfer request block according to the transfer request block, and transmits the packet.

5. The serial transmission controller as claimed in claim 1, wherein when an interception condition is met, the interception control unit notifies the transmission unit to continue to transmit the next packet of the transfer request block.

6. The serial transmission controller as claimed in claim 5, wherein the interception condition comprises:
   the transfer request block being a normal transfer request block;
   the packet of the transfer request block having been successfully transmitted;
   the time being still within a preset transmission period when the interception control unit receives the transmission-completion signal;
   the maximum packet length of the endpoint of the external device corresponding to the transmission request being greater than a preset packet length; and
   a number of interception that the interception control unit has intercepted being less than or equal to a preset number of interception.

7. The serial transmission controller as claimed in claim 6, wherein the interception condition of the packet of the transfer request block having been successfully transmitted is met, when:
   the external device receives the packet from the serial transmission controller successfully, and correspondingly returns an acknowledgement message to the serial transmission controller; and the serial transmission controller receives the acknowledgement message successfully; or
   the serial transmission controller receives the packet from the external device successfully, and a cyclic redundancy check of the packet is passed, and the serial transmission controller transmits the acknowledgement message to the external device.

8. The serial transmission controller as claimed in claim 5, wherein the transmission response comprises the transmission message generated after the packet of the transfer request block is sent; the interception control unit generates another transmission request according to the transmission message generated after the transfer request block is sent; and the transmission unit transmits the next packet according to the another transmission request.

9. The serial transmission controller as claimed in claim 8, wherein after the transmission unit finishes the transmission of the next packet according to the another transmission request, the transmission unit generates another transmission response, and send the another transmission response to the interception control unit; the interception control unit generates a final transmission response according to the another transmission response, and send the final transmission response to the scheduling unit; and the scheduling unit updates the pipe data according to the final transmission response.

10. The serial transmission controller as claimed in claim 1, wherein the transmission request comprises a transmission start flag; the transmission start flag is always at a high voltage level during the transmission of the packet and the next packet.

11. A data transmission method to transmit data between a memory and an external device, comprising:
   obtaining pipe data from the memory, and obtaining a transfer request block from the memory according to the pipe data;
   generating a transmission request according to the pipe data and the transfer request block;
   transmitting a packet of the transfer request block according to the transmission request, and correspondingly generating a transmission response; wherein the transmission response comprises a transmission-completion signal, a data length that has not been transmitted in the transfer request block, and a transmission message of the transfer request block; and
   continuing to transmit a next packet of the transfer request block when the transmission response is received and the data length that has not been transmitted in the transfer request block is greater than 0.

12. The data transmission method as claimed in claim 11, wherein the transmission message of the transfer request block comprises a data length that has been transmitted in the transfer request block, and the transfer request block comprises a data length that should be transmitted; wherein the data transmission method further comprises: calculating the data length that has not been transmitted by using the formula len=len1−len2, and send the data length that has not been transmitted to the interception control unit; wherein len1 is the data length that should be transmitted, len2 is the data length that has been transmitted, and len is the data length that has not been transmitted in the transfer request block; wherein the data length that should be transmitted is stored in the pipe data by a driver when the data transmission method transmits the data between the memory and the external device.

13. The data transmission method as claimed in claim 11, further comprising: storing the pipe data into a pipe cache.

14. The data transmission method as claimed in claim 11, wherein the transmission request comprises the address of the transfer request block; the data transmission method further comprises: reading the transfer request block according to the address of the transfer request block, reading the packet of the transfer request block according to the transfer request block, and transmitting the packet.

15. The data transmission method as claimed in claim 11, further comprising: continuing the transmission of the next packet of the transfer request block when an interception condition is met.

16. The data transmission method as claimed in claim 15, wherein the interception condition comprises:
   the transfer request block being a normal transfer request block;
   the packet of the transfer request block having been successfully transmitted;
   the time of receiving the transmission-completion signal being still within a preset transmission period;
   the maximum packet length of the endpoint of the external device corresponding to the transmission request being greater than a preset packet length; and
   a number of interception that have been intercepted being less than or equal to a preset number of interception.

17. The data transmission method as claimed in claim 16, wherein the interception condition of the packet of the transfer request block having been successfully transmitted is met, when:
   after the external device receives the packet successfully and correspondingly returns an acknowledgement message, the acknowledgement message is received successfully; or
   the packet from the external device is successfully received, and the acknowledgement message is transmitted to the external device after a cyclic redundancy check of the packet is correct.

18. The data transmission method as claimed in claim 15, wherein the transmission response comprises the transmission message generated after the packet of the transfer request block is sent; the data transmission method further comprises: generating, by a interception control unit, another transmission request according to the transmission message generated after the packet of the transfer request block is sent, and transmitting, by a transmission unit, the next packet according to the another transmission request.

19. The data transmission method as claimed in claim 18, further comprising: generating, by the transmission unit, another transmission response and sending, by the transmission unit, the another transmission response to the interception control unit after finishing the transmission of the next packet according to the another transmission request; generating, by the interception control unit, a final transmission response according to the another transmission response and sending, by the interception control unit, the final transmission response to a scheduling unit; and updating, by the scheduling unit, the pipe data according to the final transmission response.

20. The data transmission method as claimed in claim 11, wherein the transmission request comprises a transmission start flag; and the transmission start flag is always at a high voltage level during the transmission of the packet and the next packet.

* * * * *